US012617975B2

(12) United States Patent
Kivimäki et al.

(10) Patent No.: US 12,617,975 B2
(45) Date of Patent: May 5, 2026

(54) FACE FOR A DIRECT THERMAL LINERLESS LABEL AND A DIRECT THERMAL LINERLESS LABEL

(71) Applicant: UPM Raflatac Oy, Tampere (FI)

(72) Inventors: Juha Kivimäki, Helsinki (FI);
Magdalena Rabska, Helsinki (FI);
Katarzyna Wojtuś, Helsinki (FI)

(73) Assignee: UPM Raflatac Oy, Tampere (FI)

( * ) Notice: Subject to any disclaimer, the term of this
patent is extended or adjusted under 35
U.S.C. 154(b) by 0 days.

(21) Appl. No.: 18/933,148

(22) Filed: Oct. 31, 2024

(65) Prior Publication Data

US 2025/0145865 A1 May 8, 2025

(30) Foreign Application Priority Data

Nov. 3, 2023 (FI) ...................................... 20236229
Apr. 16, 2024 (FI) ...................................... 20245484

(51) Int. Cl.
| | |
|---|---|
| *B32B 7/12* | (2006.01) |
| *C09J 5/00* | (2006.01) |
| *C09J 7/29* | (2018.01) |
| *C09J 7/35* | (2018.01) |
| *C09J 7/38* | (2018.01) |
| *G09F 3/02* | (2006.01) |

(Continued)

(52) U.S. Cl.
CPC .................. *C09J 7/29* (2018.01); *B32B 7/12*
(2013.01); *C09J 5/00* (2013.01); *C09J 7/35*
(2018.01);
(Continued)

(58) Field of Classification Search
CPC ..... B32B 7/12; G09F 3/02; G09F 2003/0241;
C09J 7/21; C09J 7/35; C09J 7/38; C09J
7/385
See application file for complete search history.

(56) References Cited

U.S. PATENT DOCUMENTS 5,674,626 A 10/1997 Khatib et al.
2022/0097337 A1 3/2022 Tiainen et al.
(Continued)

FOREIGN PATENT DOCUMENTS

JP H10131098 A 5/1998
JP H10140104 A 5/1998
(Continued)

OTHER PUBLICATIONS

European Search Report for the corresponding European Application No. 24208988, Date of Mailing: Mar. 26, 2025; 7 pages.
European Search Report for the corresponding European Application No. 24208986, Date of Mailing: Mar. 26, 2025; 5 pages.

*Primary Examiner* — Elizabeth E Mulvaney
(74) *Attorney, Agent, or Firm* — Nixon Peabody LLP

(57) ABSTRACT

The specification relates to a face (100, 200) for a direct thermal linerless label. The face (100, 200) comprises a release layer (101, 201), a thermal layer (102, 202), a pre-coat layer (103, 203), a base paper (104, 204), and a barrier layer (105, 205). The base paper (104, 204) has a grammage of from 50 to 90 g/m$^2$ and the barrier layer (105, 205) has a coat weight (dry) of from 0.5 to 3.5 g/m$^2$. Further, a direct thermal linerless label (210), a linerless label product roll comprising direct thermal linerless labels and a labelled item are provided. Also, use of the direct thermal linerless label (210) for labelling an item as well as a method of manufacturing a linerless label web for providing the linerless product roll are provided.

9 Claims, 1 Drawing Sheet

(51) Int. Cl.
  *B41J 2/32*          (2006.01)
  *B41J 3/407*         (2006.01)

(52) U.S. Cl.
  CPC ................ *C09J 7/385* (2018.01); *G09F 3/02*
        (2013.01); *B41J 2/32* (2013.01); *B41J 3/4075*
          (2013.01); *C09J 2203/334* (2013.01); *C09J*
            *2301/302* (2020.08); *C09J 2301/304*
          (2020.08); *G09F 2003/0202* (2013.01); *G09F*
            *2003/0241* (2013.01); *G09F 2003/025*
                    (2013.01)

(56)                References Cited

U.S. PATENT DOCUMENTS

| | | | |
|---|---|---|---|
| 2023/0108262 A1* | 4/2023 | Tiainen | G09F 3/02 |
| | | | 40/638 |
| 2023/0286243 A1* | 9/2023 | Kivimaki | B31D 1/021 |
| 2025/0148939 A1 | 5/2025 | Wojtus et al. | |

FOREIGN PATENT DOCUMENTS

| | | | |
|---|---|---|---|
| JP | H10203018 A | 8/1998 | |
| JP | H10297091 A | 11/1998 | |
| JP | 2013020248 A | 1/2013 | |
| JP | 2014032241 A | 2/2014 | |
| JP | 2022060160 A | 4/2022 | |
| WO | 2015118215 A1 | 8/2015 | |
| WO | 2016147630 A1 | 9/2016 | |
| WO | 2020260765 A1 | 12/2020 | |

* cited by examiner

FACE FOR A DIRECT THERMAL LINERLESS LABEL AND A DIRECT THERMAL LINERLESS LABEL

RELATED APPLICATIONS

This application claims priority to Finnish Patent Application No. 20236229, filed on Nov. 3, 2023, and Finnish Patent Application No. 20245484, filed Apr. 16, 2024, each of which is incorporated by reference herein in its entirety.

TECHNICAL FIELD

The specification relates to a face for a direct thermal linerless label. Further, the specification relates to a direct thermal linerless label, a linerless label product roll comprising direct thermal linerless labels and a labelled item. Still further, the specification relates to use of the direct thermal linerless label for labelling an item as well as to a method of manufacturing a linerless label web for providing the linerless product roll.

BACKGROUND

Conventionally water-based adhesives are particularly challenging with direct thermal linerless face materials (papers). Direct coating of the water-based adhesive causes adhesive wetting, which changes viscoelastic properties of the face paper, consequently causing diverse problems in the manufacturing phase as well as in label application phase at the end user site. Changes in the viscoelastic properties refer to decreased tensile strength level and increased elongation in machine direction (MD) during the adhesive coating and drying/curing process. The problems caused by the changes include for example severe curling of the label taking place after direct thermal printing and cutting of the labels, dimensional instability after guillotine cutting, as well as web breaks with lower basis weight face papers.

Furthermore, adhesives when used with paper-based direct thermal linerless face are prone to migration of the adhesive components through the face. Migration of the adhesive components into the thermal layer of the face decreases the sensitivity level of the thermal layer. This worsens the direct thermal printability properties of the face. Thus, there is need for new face materials that would alleviate the above discussed challenges.

SUMMARY

The face disclosed herein has improved properties that have positive impact on label face performance ranging from the label web manufacturing to the dispensing of the labels. Wetting of the face in adhesive coating process with water-based adhesive is prevented or diminished, thereby providing improved tension control and better dimensional stability. Further, the face disclosed herein provides improved flatness, i.e., lower curling level of the labels, thereby enabling more efficient printing process and easier dispensing, particularly with automatic dispensers. Still further, the face shows improved stability of the thermal layer, thereby ensuring good printing quality even after aging.

According to an embodiment, face for a direct thermal linerless label is provided. The face comprises a release layer, a thermal layer, a pre-coat layer, a base paper, and a barrier layer. The base paper has a grammage of from 50 to 90 g/m² and the barrier layer has a coat weight (dry) of from 0.5 to 3.5 g/m².

According to another embodiment, a direct thermal linerless label is provided. The direct thermal linerless label comprises pressure sensitive adhesive and a face comprising a release layer, a thermal layer, a pre-coat layer, a base paper, and a barrier layer, the base paper having a grammage of from 50 to 90 g/m². The release layer and the pressure sensitive adhesive are arranged on opposite sides of the base paper.

In an embodiment, a linerless label product roll comprising the direct thermal linerless labels disclosed herein is provided.

Further, in an embodiment, a labelled item comprising an item and a direct thermal linerless label as disclosed herein is provided. The direct thermal linerless label is attached to a surface of the item via the pressure sensitive adhesive of the direct thermal linerless label.

In an embodiment, use of the direct thermal linerless label as disclosed herein for labelling an item is provided.

According to yet another embodiment, a method of manufacturing a linerless label web for providing the linerless label product roll is provided. The method comprises arranging a face or a carrier as a substrate,
coating the substrate with pressure sensitive adhesive,
drying and/or curing the pressure sensitive adhesive on the substrate,
in case of the substrate being a carrier, transferring the pressure sensitive adhesive from the carrier to a face, and
winding the face with the adhesive thereon into a roll of linerless label web.

The face comprises a release layer, a thermal layer, a pre-coat layer, a base paper, and a barrier layer. The base paper has a grammage of from 50 to 90 g/m² and the barrier layer has a coat weight (dry) of from 0.5 to 3.5 g/m².

Figure 1:
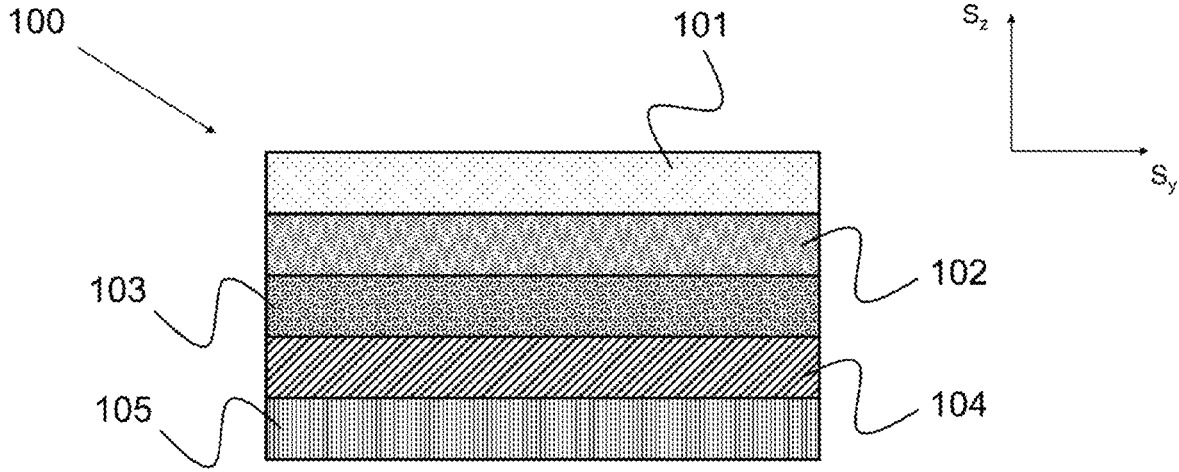
FIG. 1 illustrates, by way of an example, a cross-sectional view of a direct thermal linerless face.

The figures are schematic and are not on particular scale.

DETAILED DESCRIPTION

The solution is described in the following in more detail with reference to some embodiments, which shall not be regarded as limiting.

In this description and claims, the percentage values relating to an amount of a material are percentages by weight (wt. %) unless otherwise indicated. Unit of thickness expressed as microns corresponds to μm. Unit of temperature expressed as degrees C. corresponds to ° C. The following reference numbers and denotations are used in this specification:

| | |
|---|---|
| 100, 200 | face |
| 101, 201 | release layer |
| 102, 202 | thermal layer |
| 103, 203 | pre-coat layer |
| 104, 204 | base paper |
| 105, 205 | barrier layer |
| 210 | direct thermal linerless label |
| 211 | pressure sensitive adhesive |

A label is a piece of material to be applied onto articles or items of different shapes and materials. An article or an item may be a package. A label comprises at least a face material also referred to as a face stock or a face. A typical way to adhere the label onto an article or an item is by use of adhesive. The label comprising an adhesive layer is referred to as an adhesive label. The adhesive may comprise or consist of pressure sensitive adhesive (PSA). A label comprising pressure sensitive adhesive may be referred to as a pressure sensitive adhesive label. Pressure sensitive adhesive labels may also be referred to as self-adhesive labels.

The labels comprising PSA can be adhered to most surfaces through an adhesive layer without the use of a secondary agent, such as a solvent, or heat to strengthen the bond. In that case the adhesive is pressure sensitive as such. Alternatively, the adhesive may be activatable in order to be pressure sensitive. The PSA forms a bond when pressure is applied onto the label at ambient temperature (e.g. between 15 and 35 degrees C.) or for cold applications even under freezing temperatures below 0 degrees C. or for hot applications in temperatures above 35 degrees C., adhering the label to the item/article to be labelled. Examples of pressure sensitive adhesives include water-based (water-borne) PSAs, solvent based PSAs and hot-melt PSAs. A label may further comprise other adhesive(s).

Labels can include, but are not limited to, paper labels and filmic labels. Labels can be linerless labels or labels with a release liner. Examples of labels include, but are not limited to, packaging labels and specialty labels. Packaging labels include, but are not limited to, labels used for packaging of beverages, food products, health and personal care products, pharmaceuticals, industrial chemicals, household chemicals or retail products. Specialty labels include, but are not limited to, repositionable labels, removable labels, washable labels, resealable labels, no-look labels, deep freezer labels and security labels.

Labels enable providing information, like product specification, on the labelled product(s). Information, e.g. print of a label, may comprise human-readable information, like image(s), logo(s), text, and/or machine-readable information, like bar code(s), QR (Quick Response) code(s). The surface of the labelled article/item may be for example plastics, glass, metal, cardboard, or paper based. The labelled article/item may be for example a container, such as a bottle, jar, canister, can, tin or the like. The label may also be applied to semi-rigid or flexible packages used for e.g. packaging of food.

Term "face" refers to a top substrate of the label, also called as a face stock or a face material. The face may have a monolayer structure or a multilayer structure comprising at least two layers. The face is the layer that is adhered to the surface of an article/item during labelling through an adhesive layer. The face comprises an adhesive side and a print side. A combination comprising a face and adhesive may be referred to as an adhesive label. The face may comprise e.g. print in order to provide information and/or visual effect. The print may exist on a top surface, reverse side or both top and reverse side of the face. Further, the label may contain additional layers, for example top coatings or overlaminates to protect the top surface and/or print of the label against rubbing or other external stress. Coating or additional layers, such as a primer, may enable enhancing compatibility of adjacent layers or parts of the label, for example adhesion between the layers. A label comprising a face, a print layer and an adhesive may be referred to as a printed label.

Term "web" refers to a continuous sheet of material. The web is generally processed by moving over rollers. Between processing stages, webs may be stored and transported as rolls.

Term "machine direction" or MD refers to manufacturing direction of a web. Machine direction may also refer to a circumferential direction of a roll. Term "cross direction" or "cross machine direction" or CD refers to a direction that is transversal to the machine direction.

The face according to the disclosure may be suitable for use as a face for a non-washable direct thermal linerless label. Term "non-washable" in this context refers to an article not intended to be removable under washing conditions, i.e., not intended to be washed off from an article. In other words, the label for which the face is intended for is not a wash-off label, i.e., a label removable from a surface of an item attached to during a washing process.

Wash-off labels typically contain an adhesive sensitive to washing conditions. Further, in order to ensure washability of the wash-off label, the face of the label typically must allow water to be penetrated and/or migrated to underside of the label. Thus, face of the wash-off labels typically show certain hydrophilicity, which may be expressed in terms of water absorptiveness. For example, a base paper of a wash-off label may have a water absorptiveness of from 10 to 30 $g/m^2$. Further, the paper-based face of the wash-off label may typically comprise wet strength resin. Wet strength resin is responsible for resisting a force of rupture.

According to an embodiment, the face according to this disclosure does not show particular hydrophilicity, as the penetration and/or migration of water from the top side to the underside of the label is not desired. The face may have a water absorptiveness of below 10 $g/m^2$, such as below 5 $g/m^2$, when measured according to an ISO standard 535 (Cobb method) using contact time of 60 seconds.

Direct thermal linerless label refers to a linerless label that is printable by direct thermal printing. Direct thermal printing is performed by applying heat to the material to be printed. It does not use any ribbon, ink or toner, but it requires that the material to be printed, i.e. in this case the label face, has a heat sensitive material that blackens when heat is applied. As the label face material is heat sensitive, the print may fade and the printed label can become hard to read and scan over time. Direct thermal labels are sensitive to abrasions and exposure to water, chemicals, and strong sunlight. For thermal printability, the face comprises a thermal layer.

Exemplary end uses of the direct thermal linerless labels according to this disclosure include for example retail applications, industrial food applications, logistics, and quick-service restaurants. In logistics and industrial food applications the labels typically are arranged to be dispensed, i.e., applied to the surface to be labelled, automatically, using fast automatic dispensers. Automatic dispensing poses certain requirements for the labels. For example, high enough initial tack and absence of curling of the labels are desired from the labels to be dispensed automatically. Typically, the labels used in retail applications and quick-service restaurants are dispensed manually.

Printing of the direct thermal linerless labels disclosed herein is typically performed separately from the manufacturing process. Thus, as a result of the manufacturing process a non-printed label product roll is provided. The label product roll is composed of a label web typically comprising one label width.

The labels are typically printed by printers that are arranged to print linerless labels. Such printers may be called linerless printers. Particularly, the printers are direct thermal linerless label printers. The printers may be so-called on-demand printers. The printers may accept linerless label product rolls with widths ranging, for example, from 10 to 100 millimeters. Thus, the label width may range, for example, from 10 to 100 millimeters. Subsequent to printing, the label is applied to the surface to be labelled either manually or automatically, as discussed above.

Linerless label is a label consisting of a face and an adhesive on the face. The face of the linerless label typically comprises a release layer. Purpose of the release layer is to make the label self-woundable. A linerless label web with pressure sensitive adhesive on its one side (bottom side) and release coating forming the release layer on its other side (top side) can be self-wound around itself without tendency of blocking the adjacent layers of the label web to each other.

A face for direct thermal linerless labels is provided. The face is illustrated in FIG. 1. The face 100 comprises a release layer 101, a thermal layer 102, a pre-coat layer 103, a base paper 104, and a barrier layer 105. Preferably the order of the layers is as stated above, the release layer being the uppermost layer and the barrier layer being the bottom layer. The base paper separates a face side and a reverse side of the face. The face side comprises the release layer, the thermal layer and the pre-coat layer. The reverse side comprises the barrier layer, also referred to as a reverse side barrier layer.

The base paper may comprise natural fiber as its raw material. Natural fiber refers to any plant material that contains cellulose. The natural fiber may be wood-based. Paper-based face is well-suited with the increasing tendency to reduce the unnecessary use of plastic materials.

The face disclosed herein is suitable for use with water-based adhesives. Thus, the face according to this disclosure shows good compatibility with water-based adhesive. This is achieved by protecting the base paper and the thermal layer of the face from adhesive wetting and migration of the adhesive components into the thermal layer. This is accomplished by providing the face with a barrier layer.

The barrier layer is the receiving surface of the adhesive of the direct thermal linerless labels disclosed herein. The barrier layer can comprise any kind of coating that is capable of serving as a physical barrier, particularly as a physical barrier preventing migration of water. Preferably the barrier layer comprises water-based coating. Exemplary components of such coatings include styrene-butadiene, styrene acrylate, kaolin and polyvinyl alcohol (PVA). In an example, the coating forming the barrier layer is kaolin-based. For example, the barrier layer may comprise PVA and kaolin. In an example the barrier layer comprises from 0.3 to 0.7 $g/m^2$ PVA and/or from 1.0 to 2.0 $g/m^2$ kaolin.

Coat weight (dry) of the barrier layer ranges from 0.5 to 3.5 $g/m^2$. From the materials' usage perspective, it is preferable to have as low coat weight as possible. Further, too high coat weight may have an impact on stiffness and affect cuttability of labels.

The barrier layer has positive impact on the label face performance ranging from the label web manufacturing to the dispensing of the labels. In the manufacturing phase the barrier layer prevents or diminishes wetting of the face, particularly the base paper, by the water-based adhesive, thereby providing improved tension control resulting in less variation in tension and better dimensional stability. Tension control is needed particularly in the slitting phase, wherein the original label web is slit, i.e., longitudinally cut to provide the label product roll (or label roll in short). Further, the barrier layer enables to achieve improved flatness, i.e., lower curling level of the labels. As discussed above, low curling level enables efficient printing process and easier dispensing with automatic dispensers, for example by preventing jams that may be caused by curled labels. Preventing jams prevents maintenance breaks, thereby enabling more efficient process.

Further, the barrier layer prevents or diminishes migration of the adhesive components into the thermal layer, thereby improving stability of the thermal layer. With more stable thermal layer, the direct thermal printability properties of the face remain constant after aging, thereby ensuring good printing quality even after aging. Adhesive components migrating into the thermal layer may decrease sensitivity levels of the thermal layer. Static sensitivity indicates the temperature at which a thermal paper will begin imaging, i.e., changing colour. Dynamic sensitivity of thermal papers indicates in practice how fast a thermal paper can be printed. The lower the dynamic sensitivity level of the thermal layer the higher the print head temperature required. Lowered sensitivity level may cause lowered printing quality with constant print head temperature. Print with lowered quality may not be machine readable reliably or not at all. Thermal papers with lowered dynamic sensitivity require higher print head temperature and/or longer exposure, i.e., slower printing speed to achieve high optical density of the print.

The base paper has a grammage of from 50 to 90 $g/m^2$, when measured according to ISO 536. In an example, the base paper has a grammage of 70 $g/m^2$. The base paper may have a caliper of from 45 to 90 μm, when measured according to ISO 534. In an example the base paper has a grammage of 50 $g/m^2$ and a caliper of 48 μm. In another example the base paper has a grammage of 70 $g/m^2$ and a caliper of 68 μm.

The base paper may comprise fibers, filler pigment, binders and additives. In an example, the base paper may comprise from 40 to 70 $g/m^2$ fibers. The base paper may comprise from 1 to 8 $g/m^2$ filler pigment. An example of a filler pigment is calcium carbonate. The base paper may comprise from 1 to 3 $g/m^2$ binders. The base paper may also comprise from 0.1 to 1.0 $g/m^2$ additives.

Purpose of the release layer is to make the label material self-woundable. This means that the linerless label web with pressure sensitive adhesive on its one side (bottom side) and release coating forming the release layer on its other side (top side) can be self-wound around itself without tendency of blocking the adjacent layers of the label web to each other. The release coating forming the release layer may be silicone-based or non-silicone-based. The release layer may comprise one or more layers of release coating. Amount of the release layer/release coating on the face may be from 0.5 to 1.5 $g/m^2$, such as 1.0 $g/m^2$.

In an example, the release coating is silicone-based. The silicone-based release coating may comprise UV curable silicone, for example UV free radical silicone or cationic UV silicone. Non-thermally curable release coating, such as UV curable silicone may be preferred in order to avoid heating of the thermally sensitive components of the thermal layer.

The thermal layer is responsible for providing direct thermal printability to the face. The thermal layer is arranged to form a thermally sensitive, reactive layer changing colour during thermal printing. As discussed above, sensitivity of the thermal layer refers to the degree to which it reacts to a given amount of heat or energy.

The thermal layer may comprise a colour former (such as a leuco dye), a developer (preferably phenol-free), an absorptive pigment (such as calcined clay), a binder (such as PVA) and additives (including for example defoamers and surfactants). In an example, the amounts of the thermal layer components may be as follows: from 0.3 to 0.7 $g/m^2$ of colour former, from 0.6 to 1.0 $g/m^2$ of developer, from 0.3 to 0.7 g/m² of absorptive pigment, from 0.3 to 0.7 g/m² of binder, and/or from 0.3 to 0.7 g/m² of additives.

The pre-coat layer of the face may comprise pigment (such as calcined clay) and binder (such as starch and/or styrene butadiene latex). In an example, the pre-coat layer may comprise from 4 to 8 g/m² of pigment and/or from 1 to 3 g/m² of binder. The pre-coat layer may have effect of reducing heat transfer from a thermal coating to the base paper. This may enable enhanced or high resolution print to be formed. The pre-coat layer may have effect of providing smoothness to the face. Smoothness of the face has positive effect on printing, for example by providing better resolution. Thus, the pre-coat layer may have positive effect on printing quality.

Figure 2:
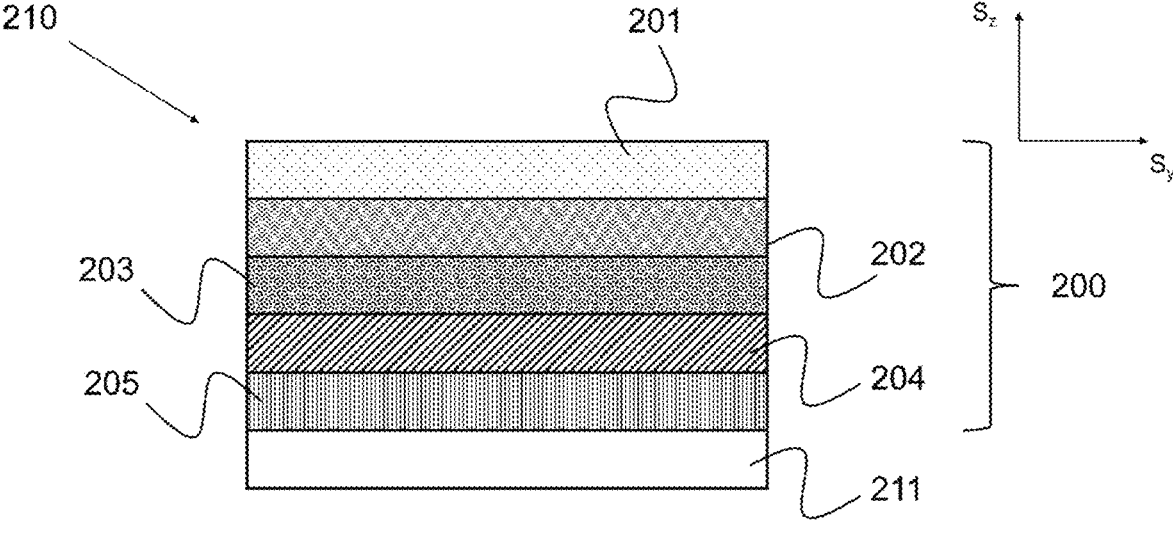
FIG. 2 illustrates, by way of an example, a cross-sectional view of a direct thermal linerless label.

The direct thermal linerless label disclosed herein comprises the face as described above as well as a pressure sensitive adhesive. The direct thermal linerless label is illustrated in FIG. 2. The direct thermal linerless label 210 comprises pressure sensitive adhesive 211 and the face 200 including a release layer 201, a thermal layer 202, a pre-coat layer 203, a base paper 204, and a barrier layer 205.

The pressure sensitive adhesive may be a water-based adhesive. Water-based adhesives provide better sustainability with less fossil-based raw materials and less volatiles involved both during manufacturing and end use. The water-based adhesive may comprise a water-based acrylic emulsion polymer composition. Alternatively, the pressure sensitive adhesive may be a hot-melt adhesive. Coat weight of the pressure sensitive adhesive may range from 12 to 25 g/m², such as from 19 to 22 g/m² (dry weight). The pressure sensitive adhesive may be arranged as a monolayer or a multilayer. The pressure sensitive adhesive may be removable or permanent adhesive.

As already mentioned, the reverse side barrier layer is the adhesive receiving surface of the face. The barrier layer prevents or diminishes migration of the adhesive components from the adhesive layer into base paper and eventually into the thermal layer. As the migration of the adhesive components into the base paper and further is prevented or diminished, it is possible to use an adhesive with lower adhesion properties (i.e., tack and peel) compared to a label having a face without the barrier layer. With the solution disclosed herein the adhesion properties of the adhesive are better when compared to a label having a face without the barrier layer.

Tack refers to an adhesive's holding power (adhesion) upon contact with a substrate. An adhesive with high initial tack will grab the substrate quickly. An adhesive with low initial tack will exhibit a low level of adhesion when applied. Tack can be measured by a loop tack measurement according to FINAT Test Method No. 9 (FTM 9). The loop tack value of the adhesive is expressed as the force required to separate, at specified speed, a loop of material brought into contact with a specified area of a surface.

Peel (also referred to as peel adhesion) refers to a measure of the adhesive's ability to wet out a surface of a substrate and subsequently adhere to the substrate. Peel thus may quantify the permanence of the adhesion or peel ability of the adhesive. Peel is defined as the force required to remove adhesive coated material from a test plate after a certain dwell time at an angle 90 degrees or 180 degrees and specified speed. Peel adhesion thus refers to final adhesion. Peel adhesion may be measured according to FINAT Test Method No. 1 or 2 (FTM 1, FTM 2).

According to an embodiment, the adhesive of the direct thermal linerless label disclosed herein has an average tack on glass/HDPE/cardboard in a range of from 1.5 to 15 N, such as from 6 to 15 N, when measured according to FTM 9.

According to an embodiment, the adhesive of the direct thermal linerless label disclosed herein has an average peel on PE/cardboard in a range of from 1.5 to 10 N, such as from 3 to 8 N, when measured according to FTM 1 or FTM 2.

Generally, higher or comparable adhesion values are obtained for labels comprising a face with a barrier layer when compared to labels comprising a face without a barrier layer. At least tack on glass and HDPE are clearly higher for labels comprising a face with a barrier layer.

The direct thermal linerless labels disclosed herein are provided as part of a linerless label product roll comprising the direct thermal linerless labels.

A method of manufacturing a linerless label web for providing the linerless label product roll comprises arranging a face or a carrier as a substrate, coating the substrate with pressure sensitive adhesive, drying and/or curing the pressure sensitive adhesive on the substrate, in case of the substrate being a carrier, transferring the pressure sensitive adhesive from the carrier to a face, and winding the face with the adhesive thereon into a roll of linerless label web. The face comprises a release layer, a thermal layer, a pre-coat layer, a base paper, and a reverse side barrier layer. The base paper has a grammage of from 50 to 90 g/m².

Width of the linerless label web is typically a multiple of the linerless label product roll (i.e., the customer roll) width. The linerless label product roll is manufactured by machine-direction slitting of the linerless label web.

Wetting of the base paper of the face by a water-based adhesive is most severe when the manufacturing process utilizes direct coating. In direct coating the water-based adhesive is coated directly onto the face and the adhesive is dried/cured on the face. The face according to this disclosure comprising the reverse side barrier layer prevents or diminishes the wetting caused by the water-based adhesive.

Alternative manufacturing method utilizing indirect coating of the adhesive may not be as prone to adhesive wetting as the direct one. In such a method the adhesive is coated onto a separate carrier and dried/cured on the carrier. Subsequently, the dried/cured adhesive is transferred from the carrier to the face. Thus, the majority of water originally contained by the adhesive is not any more present when the face meets the adhesive. However, the label webs produced by the indirect adhesive coating method may still be prone to migration of the adhesive components from the adhesive to the face. The face according to this disclosure comprising the reverse side barrier layer also prevents or diminishes the migration of the adhesive components.

Examples

Exemplary direct thermal linerless label (label 1) has a face with the following construction:
1) release layer with silicone-based release coating
2) thermal layer comprising
  leuco dye as a colour former
  phenol-free developer
  absorptive pigment
  binder
  additives
3) pre-coat layer comprising calcined clay as pigment and a binder
4) base paper comprising
  about 50 g/m² fibers
  filler pigment
  binders
  additives 5) barrier layer comprising PVA and kaolin. Barrier layer coat weight (dry) is 2 g/m².

Comparative direct thermal linerless label (label 2) has the same face construction except the barrier layer is missing. Both labels have a base paper grammage of 70 g/m². Both labels comprise pressure sensitive adhesive comprising a water-based acrylic emulsion polymer composition arranged next to the barrier layer of the face. Both labels have a PSA coat weight (dry) from 19 to 22 g/m². Coating speed of 100 m/min was used in the adhesive coating phase.

Adhesion properties of the labels 1 and 2 were determined and are shown in Table 1 below.

TABLE 1

|  | Label 1 | Label 2 |
|---|---|---|
| Tack on glass (N) | 12.9 | 8.3 |
| Tack on HDPE (N) | 10.0 | 7.86 |
| Tack on CB (N) | 7.3 | 7.3 |
| Peel on PE (N) | 5.5 | 4.7 |
| Peel on CB (N) | 6.1 | 5.1 |

Table 1 shows that the label 1 with the barrier layer shows higher tack on glass and HDPE when compared to label 2 comprising no barrier layer. The tack values on cardboard (CB) are comparable. Again, the peel on both PE and cardboard is higher for label 1 when compared to the label 2.

The invention claimed is:

1. A face for a direct thermal linerless label, wherein the face comprises:
   a release layer;
   a thermal layer;
   a pre-coat layer;
   a base paper; and
   a barrier layer,
   wherein the base paper has a grammage of from 50 to 90 g/m² and the barrier layer has a coat weight (dry) of from 0.5 to 3.5 g/m²; and
   wherein the barrier layer comprises PVA and kaolin.

2. A direct thermal linerless label, comprising a pressure sensitive adhesive and the face according to claim 1, wherein the release layer and the pressure sensitive adhesive are arranged on opposite sides of the base paper.

3. The direct thermal linerless label according to claim 2, wherein the pressure sensitive adhesive is a water-based adhesive.

4. The direct thermal linerless label according to claim 2, wherein the pressure sensitive adhesive is a hot-melt adhesive.

5. The direct thermal linerless label according to claim 2, wherein a coat weight of the pressure sensitive adhesive is from 12 to 25 g/m².

6. A linerless label product roll comprising the direct thermal linerless labels according to claim 2.

7. A labelled item comprising an item and a direct thermal linerless label according to claim 2, wherein the direct thermal linerless label is attached to a surface of the item via the pressure sensitive adhesive of the direct thermal linerless label.

8. A method of using the direct thermal linerless label according to claim 2, comprising labelling an item with the direct thermal linerless label.

9. A method of manufacturing a linerless label web for providing the linerless label product roll according to claim 6, the method comprising:
   arranging a face or a carrier as a substrate;
   coating the substrate with pressure sensitive adhesive;
   drying and/or curing the pressure sensitive adhesive on the substrate;
   in case of the substrate being a carrier, transferring the pressure sensitive adhesive from the carrier to a face; and
   winding the face with the adhesive thereon into a roll of linerless label web.

\* \* \* \* \*